United States Patent [19]
Iizuka et al.

[11] Patent Number: 4,739,434
[45] Date of Patent: Apr. 19, 1988

[54] DISK CARTRIDGE HAVING A HUB INCLUDING A STEPPED PORTION

[75] Inventors: Michio Iizuka, Saku; Haruo Shiba, Komoro, both of Japan

[73] Assignee: TDK Corporation, Tokyo, Japan

[21] Appl. No.: 753,780

[22] Filed: Jul. 11, 1985

[30] Foreign Application Priority Data

Jul. 31, 1984 [JP] Japan ............................ 59-119051[U]

[51] Int. Cl.⁴ ............................................. G11B 23/03
[52] U.S. Cl. .................................................... 360/133
[58] Field of Search ........................... 360/133, 97-99; 208/444; 369/270-271, 282

[56] References Cited

U.S. PATENT DOCUMENTS

| | | | |
|---|---|---|---|
| 4,445,157 | 4/1984 | Takahashi | 360/133 |
| 4,571,718 | 2/1986 | Cahill et al. | 360/133 X |
| 4,573,096 | 2/1986 | Gerfast | 360/133 |

FOREIGN PATENT DOCUMENTS 2101390 1/1983 United Kingdom ................ 360/133

OTHER PUBLICATIONS

Johnson et al., "Cartridge and Cartridge-Actuating Mechanism for a Magnetic Recording Disk", IBM TDB, Mar. 1979, vol. 21, No. 10, pp. 4192-4194.

Primary Examiner—John H. Wolff
Assistant Examiner—David J. Severin
Attorney, Agent, or Firm—Oblon, Fisher, Spivak, McClelland & Maier

[57] ABSTRACT

A disk cartridge having a hard casing in which a magnetic disk with a hub is rotatably received. A stepped portion is formed at a peripheral edge portion of a contacting surface of the hub which is in contact with a supporter on a driving unit to support rotation of the hub, thereby increasing flatness in the contacting surface.

2 Claims, 2 Drawing Sheets

DISK CARTRIDGE HAVING A HUB INCLUDING A STEPPED PORTION

BACKGROUND OF THE INVENTION

1. FIELD OF THE INVENTION:

The present invention relates to a floppy disk. More particularly, it relates to a disk cartridge using a hard casing instead of a thin jacket.

2. DESCRIPTION OF THE PRIOR ART

A floppy disk has widely been used as an exchangeable information storage medium which can be fitted to a driving unit (a magnetically recording and reproducing device) and removed from it for storage or transportation in the same manner as a magnetic tape cassette and a disk pack. Eight-inch and five-inch floppy disks have been commonly used. For such floppy disks, a thin flexible jacket made of vinyl chloride has been used as a casing to protect a magnetic disk. In consideration that the thin flexible jacket type floppy disk is insufficient to protect the magnetic disk, there has been proposed a disk cartridge in which a thick, hardly deformable, strong hard case is used and lining sheets are attached to the inner surfaces of the hard casing to receive a magnetic disk in a rotatable manner.

FIG. 1 is a perspective view showing the outline of the above-mentioned disk cartridge and FIG. 2 is a longitudinal cross-sectional view of the disk cartridge.

In the Figures, a reference numeral 10 designates an upper hard casing, a numeral 12 designates a lower hard casing and a numeral 14 designates a shutter which covers a window for insertion of a magnetic head (not shown) to protect a magnetic disk 16 recieved in the disk cartridge when it is in non-use. The magnetic disk 16 has an annular base portion which is coated with magnetic material on both its surfaces and is provided with a hub 20 at the central portion. The hub 20 includes a central circular projection 22 projecting downward as the major part and an annular part 24 for connecting the magnetic disk 16, the annular part 24 extending outwardly from the outer peripheral edge of the circular projection. The circular projection 22 of the hub faces a magnetic-disk driving window 26 formed in the lower hard casing 12 to substantially cover the window 26 when the disk cartridge is not used, whereby in addition to provision of the shutter 14, protection of the magnetic disk 16 received in the disk cartridge can be easy and operation of the cartridge is simple to thereby increase reliability.

A reference numeral 28 designates a driving pin upwardly extending from a mounting table 30 of the driving unit. The central opening 32 of the hub 20 is fitted to the driving pin in the vicinity of the top end of it, which reaches a bearing part 34 at the center of the upper hard casing 10. Accordingly, there is no magnetic-disk driving window in the upper hard casing 10 and the top end of the driving pin 28 merely comes in contact with the central bearing part 34 provided in the upper hard casing. A supporting member 36 for the hub which may be in an annular form is mounted on the mounting table 30 of the driving unit. The upper surface of the supporting member 36 is in contact with the hub 20 so that it supports the hub when rotated. The supporting member 36 has a central opening 38 through which the driving pin 28 extends with an air gap between the cylindrical surface and the inner wall of the central opening 38. A magnet 40 which may be a ringed magnet is provided around the supporting member 36 for supporting the rotation of the hub 20. The magnet 40 is able to attract the hub 20, which may be a metal hub of a ferromagnetic substance such as stainless steel.

FIG. 3 is an enlarged cross-sectional view showing the conventional hub as in FIG. 2. As apparent from FIG. 3, a contacting surface of the hub which is in contact with the supporting member 36, namely the lower surface of the circular projection 22 of the hub, is slightly raised from the outer radially peripheral portion of the circular projection 22 toward the central opening 32 of the hub 20 in which the driving pin 28 is inserted.

When the raised lower surface is formed, it is necessary that a curved corner portion 31 is formed at a portion to be bent of the contacting surface of the hub. It is difficult to form corner portion without a curvature when the contacting surface of the hub is bent. Formation of the curved corner portion 31, however, deteriorates flatness in the contacting surface (reference surface) of the hub due to a stamping operation. Therefore, the hub 20 can not stably be supported by the supporting member 36 when the hub is rotated. Particularly, there takes place oscillation of the hub 20 in the vertical direction as shown by the arrow mark X even when the metallic hub 20 is attracted by the magnet 40, on account of which contact between the magnetic head (not shown) and the magnetic disk 16 becomes worse, whereby performance of the disk cartridge decreases.

SUMMARY OF THE INVENTION

It is an object of the present invention to eliminate the disadvantage of the conventional disk cartridge and to provide a disk cartridge which provides a stable support for a hub thereby reducing vertical oscillation of the hub when rotated, by improving flatness of a contacting surface of the hub.

The foregoing and the other objects of the present invention have been attained by providing a disk cartridge having a hard casing in which a magnetic disk with a hub is rotatably received, characterized in that a stepped portion is formed at a peripheral edge portion of a contacting surface of the hub which is in contact with a supporter on a driving unit to support rotation of the hub, thereby increasing flatness in the contacting surface. The stepped portion formed at the peripheral edge of the contacting surface of the hub comprises an outer curved portion which is firstly formed by squeezing operation and an inner curved portion which is secondly formed in the same manner. If necessary, an additional curved portion may be formed at the inner side of the inner curved portion by squeezing to further increase flatness of the contacting surface.

DETAILED DESCRIPTION OF PREFERRED EMBODIMENT

Figure 1:
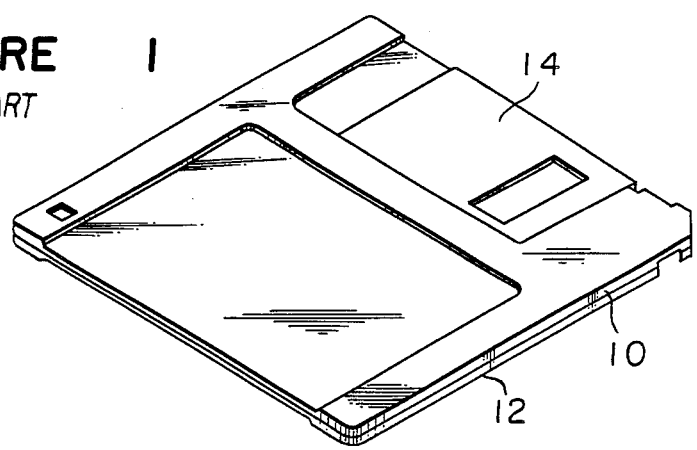
FIG. 1 is a perspective view showing the outline of a conventional disk cartridge.
Figure 2:
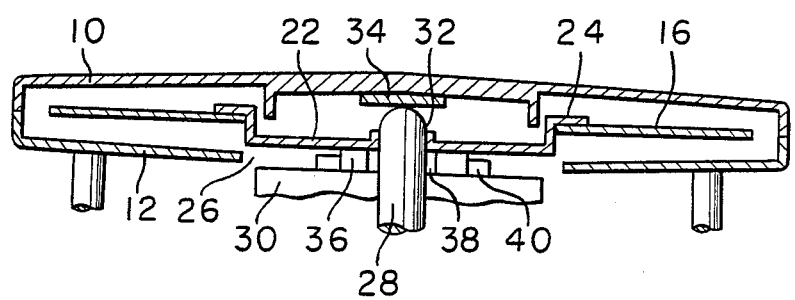
FIG. 2 is a longitudinal cross-sectional view of the cartridge shown in FIG. 1.
Figure 3:
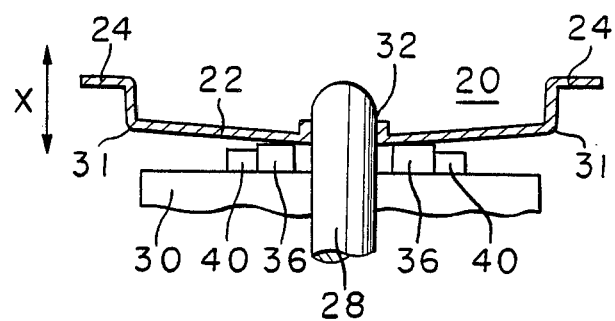
FIG. 3 is an enlarged cross-sectional view of the hub in FIG. 2.
Figure 4:
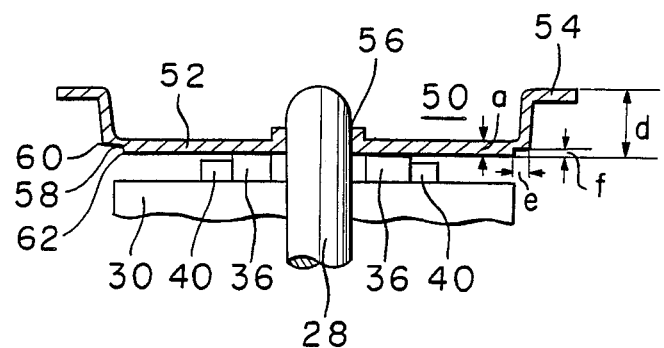
FIG. 4 is a longitudinal cross-sectional view of an embodiment of the disk cartridge according to the present invention.
Figure 5:
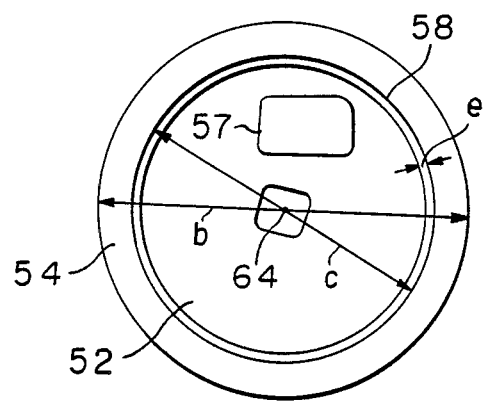
FIG. 5 is a bottom view of the hub used for the present invention.

An embodiment of the present invention will be described with reference to FIG. 4 which shows a disk cartridge mounted on a driving unit and FIG. 5 which is a bottom view of an embodiment of the hub according to the present invention. In the Figures, the same reference numerals as in FIGS. 3 and 4 designate the same parts and therefore, description of these parts is omitted.

A hub 50 has a circular projection 52 formed in its central portion and a flange or an annular part 54 around the circular projection 52 to connect the magnetic disk 16. The hub 50 is provided with the central opening 56 formed in the center of the circular projection 52. The driving pin 28, which extends upwardly from the mounting table 30 of the driving unit and passes through the ringed supporting member 36, is fitted to the central opening 56. There is formed an opening 57 for receiving another driving pin (not shown). A stepped portion 58 is formed at the peripheral edge portion of a contacting surface of the hub 50, namely the lower surface of the circular projection 52 with which the supporter 36 is in contact. The stepped portion 58 is formed by pressing the peripheral edge portion of the hub 50 so as to give two curved portions 60 and 62, i.e. outer and inner curved portions having a small curvature. Accordingly, adverse affect to the contacting surface (reference surface) due to machining of it can be minimised. Namely, even though the inner portion of the contacting surface of the hub 50 projects from the peripheral edge by first pressing operation to form the outer curved portion 60, which more or less deteriorates flatness of the contacting surface, the flatness can be improved by the second squeezing operation to form the inner curved portion 62. The shape of the stepped portion, which is determined by the width, the height and so on, to be formed at the peripheral edge portion of the contacting surface can be selected as desired.

The stepped portion can preferably be obtained when the width e is 0.5 mm and the height f is in a range from 0.03 mm–0.05 mm, wherein the thickness a of the hub is 0.3 mm, the maximum diameter b of the hub is 31 mm, the diameter c of the circular projection (including the width of the stepped portion) of the hub is 25 mm and the distance d between the contacting surface of the hub and the upper surface of the flange is 1.9 mm. A reference numeral 64 designates the center of the hub.

When the hub 50 having the contacting surface of a high flatness is positioned at the central portion of the magnetic disk 16, there is obtainable a large contacting area between the hub 50 and the supporter 36 on the driving unit, without causing any limitation of the area of a deflecting/toward the driving pin 28 as in the conventional disk cartridge. Further, distance between the hub of a ferromagnetic substance and the magnet 40 becomes close to thereby increase an attractive force of the magnet 40 to the hub 50.

As described above, according to the present invention, flatness of the contacting surface of the hub is improved by forming a stepped portion at the peripheral edge portion of the contacting surface, the hub can be stably supported for rotation of the magnetic disk whereby oscillation of the magnetic disk in the vertical direction can be minimized. Further, good contacting condition between the magnetic head and the magnetic disk can particulary be provided in tracks at the inner circumferential side, whereby performance of the disk cartridge can be improved.

What is claimed is:
1. A disc cartridge comprising:
 a hard casing; and
 a magnetic disc supported for rotation within said casing, said disc including a hub comprising:
   (a) a stamped circular projection having a central opening into which a driving pin of a driving unit may be inserted and a contacting surface which is adapted to be contacted with a supporting member of said driving unit,
   (b) an annular part unitarily formed with said circular projection at a radially outer peripheral edge portion of said circular projection, said annular part being bent with respect to said circular projection to form a curved corner portion at an intersection of said circular projection and said annular part; and
   (c) a stepped portion formed in said contacting surface at said peripheral edge portion, said stepped portion including outer and inner curved portions having small curvature,
 whereby the flatness of said contacting surface and the operational stability of said hub are improved.
2. The disk cartridge according to claim 1, wherein said outer curved portion is formed by a first pressing operation and said inner curved portion is formed by a second pressing operation.

* * * * *